July 11, 1933.   F. E. STRICKLAND   1,918,148

COTTER PIN LOCK

Filed June 20, 1930

Inventor
F. E. Strickland

By Clarence A. O'Brien
Attorney

Patented July 11, 1933

1,918,148

UNITED STATES PATENT OFFICE

FREDERICK E. STRICKLAND, OF ALEXANDRIA, LOUISIANA

COTTER PIN LOCK

Application filed June 20, 1930. Serial No. 462,695.

This invention relates to retaining and locking means for the conventional type of cotter pins or keys when in use and in place in shafts, pins and other parts of machinery and the like, whereby they are retained against inadvertent or accidental displacement and loss.

The object of this invention is to provide a simple, inexpensive, and easily manufactured device of the kind which is positively operative to retain and maintain in place cotter pins which have been pushed through a hole in an axle, shaft, pin or the like, and the legs thereof spread in conventional manner, to confine removable wheels, bushings and the like.

The particular means provided by this invention to prevent accidental displacement of cotter pins consists of a ringlike member to be associated with the eye and spread leg portions of the cotter pin and the shaft or pin, on which the cotter pin is mounted.

Further objects of the invention and its nature, and the combination and construction of its parts will be clearly understood from the attached drawing and the explanations thereof as follows, in which:—

Figure 1:
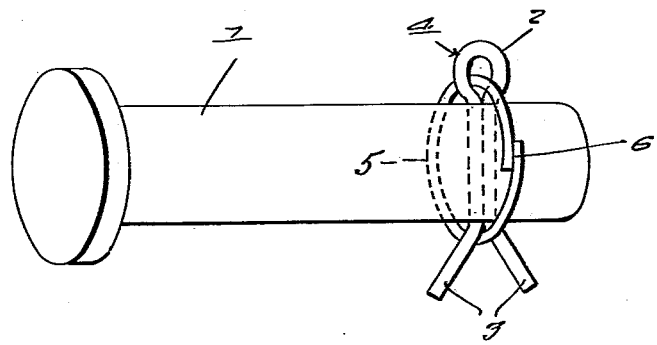
Figure 1 illustrates an application of the invention to a cotter pin mounted in a railroad brake pin.
Figure 3:
Figure 3 shows a piece of material from which the ring is formed before being bent to shape.
Figure 2:
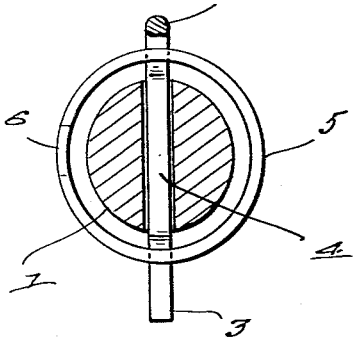
Figure 2 is an end view from the right and partially in section.
Figure 4:
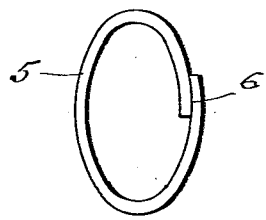
Figure 4 illustrates the finished ring.

Illustrated is a railroad car brake pin 1 of conventional type comprising a shaft having an annular bearing flange at one end and a transverse hole near the other end to receive a cotter pin to cooperate with said annular flange to retain the brake pin in operative position with the brake shoe and brake actuator. In said hole in the shaft is a cotter pin designated 4 of conventional type having an eye 2 and leg portions extending from said eye and through the hole in the shaft and adapted to be bent as shown at 3. A ring 5 is formed like a key ring from a single bar or wire bent to the shape shown in Figure 4 and having its end portions in overlapping side by side relationship. As indicated at 6, the ring is adapted to have its ends spread and one of them inserted through the eye, and then the ring rotated so that this end passes between the bent legs, of the cotter pin as shown in Figures 1 and 2, thereby effectively retaining and locking the cotter pin positioned in the shaft of the brake pin or the like against accidental displacement.

It will be observed that the lock is capable of being easily and quickly applied and removed, may be made to fit any size cotter pin, and may be applied to said cotter pins without removing the same from their positions, a valuable and novel feature not hitherto supplied in the art, at an equally low cost.

It is to be understood that any changes in size or form or materials within the scope of the invention may be resorted to and that the invention is not confined to the particular embodiment illustrated above.

I claim:—

1. The combination with a shaft having a transverse opening and a cotter pin in the opening, of a ring passed around the shaft through the eye and between the legs of the cotter pin on the opposite side of the shaft.

2. The combination with a shaft having a transverse opening and a cotter pin in the opening, of a ring passed around the shaft through the eye and between the legs of the cotter pin on the opposite side of the shaft, said ring being broken and the ends thereof arranged in overlapping relation with each other so as to prevent any portion of the cotter pin from being passed from the ring without separating the ends of the ring.

3. The combination with a shaft having a transverse opening and a cotter pin in the opening, of a ring passed around the shaft through the eye and between the legs of the cotter pin on the opposite side of the shaft, said ring being broken and the ends thereof being arranged closely together to prevent any portion of the cotter pin from passing from the ring without further separating the said ends.

4. A cotter pin lock structure comprising a shaft having a transverse opening, a cotter pin in the opening with its legs spread in retaining manner, a ring encircling the shaft and passing through the eye and between the legs of the cotter pin so as to maintain the legs spread in retaining position and be carried by the shaft and pin.

5. A cotter pin lock structure comprising a shaft having a transverse opening, a cotter pin in the opening with its legs spread in retaining manner, a ring encircling the shaft and passing through the eye and between the legs of the cotter pin so as to maintain the legs spread in retaining position and be carried by the shaft and pin, said ring comprising a broken annulus the ends of which are disposed side by side in overlapping manner, the ends being capable of being separated to permit the passage therebetween of portions of the eye and legs for removing and installing the ring on the shaft and cotter pin.

In testimony whereof I affix my signature.

FREDERICK E. STRICKLAND.